Patented Oct. 6, 1953

2,654,741

UNITED STATES PATENT OFFICE 2,654,741

N-β-(3-PYRIDYL)-ETHYLMORPHOLINE SALT OF PENICILLIN

Harley W. Rhodehamel, Jr., Indianapolis, Ind., assignor to Eli Lilly and Company, Indianapolis, Ind., a corporation of Indiana No Drawing. Application February 13, 1952, Serial No. 271,431

2 Claims. (Cl. 260—239.1)

This invention relates to a novel pencillin salt and the preparation thereof.

I have discovered that N-β-(3-pyridyl)-ethylmorpholine or its salts can be combined with penicillin or its salts by neutralization or metathetical reactions to form a sparingly soluble penicillin salt, thereby affording a means of precipitating penicillin from solution, and of purifying penicillin. Moreover, the novel penicillin salt can be utilized therapeutically. A prolonged penicillin blood level can be secured upon administering the salt parenterally by methods known to the medical art.

The following examples illustrate the preparation of the novel salt of this invention:

Example 1

To 3 g. of a solution of penicillin (e. g. a commercial mixture of the several penicillins) dissolved in about 50 ml. of amyl acetate are added 3 g. of N-β-(3-pyridyl)-ethylmorpholine dissolved in 25 ml. of amyl acetate. The mixture is cooled and stirred occasionally whereupon the N-β-(3-pyridyl)-ethylmorpholine salt of penicillin precipitates. The salt is isolated as by decantation or filtration, and dried in vacuo.

The salt is represented by the following formula in which P represents penicillin:

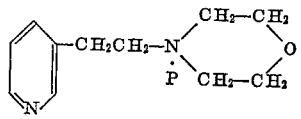

Example 2

To an aqueous solution of 0.3 g. of the potassium salt of penicillin G in 1.8 ml. of water is added a solution of 0.3 g. of N-β-(3-pyridyl)-ethylmorpholine dihydrochloride in 5 ml. of water. The mixture is cooled and stirred occasionally whereupon the slightly soluble N-β-(3-pyridyl)-ethylmorpholine salt of penicillin G precipitates. The salt is separated, and dried in vacuo.

N-β-(3-pyridyl)-ethylmorpholine can be prepared as follows: 3-pyridylacetothiomorpholide, obtained by the method of Schwenk et al., J. Organic Chemistry 11, 798 (1946), is desulfurized according to the process of Kornfeld, J. Organic Chemistry 16, 131, (1951), using Raney nickel. The N-β-(3-pyridyl)-ethylmorpholine which is thus obtained forms acid addition salts when treated by the usual methods.

I claim:

1. The N-β-(3-pyridyl)-ethylmorpholine salt of penicillin represented by the following formula in which P represents penicillin:

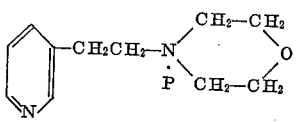

2. The N-β-(3-pyridyl)-ethylmorpholine salt of penicillin G.

HARLEY W. RHODEHAMEL, Jr.

References Cited in the file of this patent

UNITED STATES PATENTS

| Number | Name | Date |
|---|---|---|
| 2,569,666 | Granatek | Oct. 2, 1951 |
| 2,578,651 | Buckwalter | Dec. 18, 1951 |

FOREIGN PATENTS

| Number | Country | Date |
|---|---|---|
| 645,037 | Great Britain | Oct. 25, 1950 |